April 24, 1928.  
E. A. HENRICSON  
1,666,899  
WINDSHIELD PIVOT  
Filed March 9, 1925
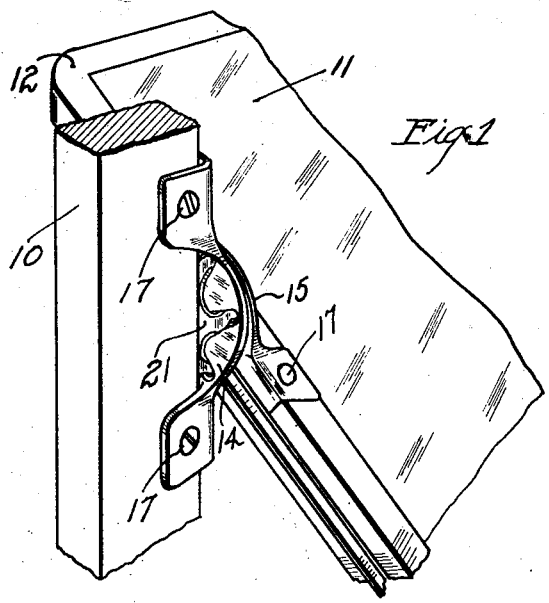
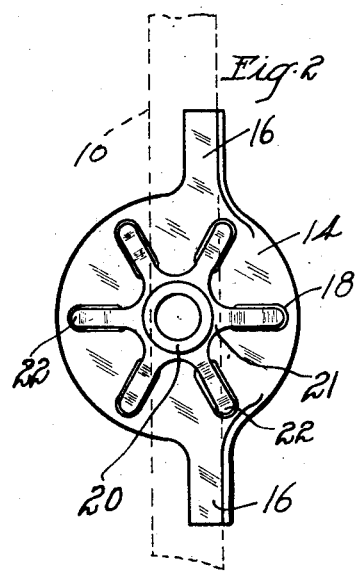
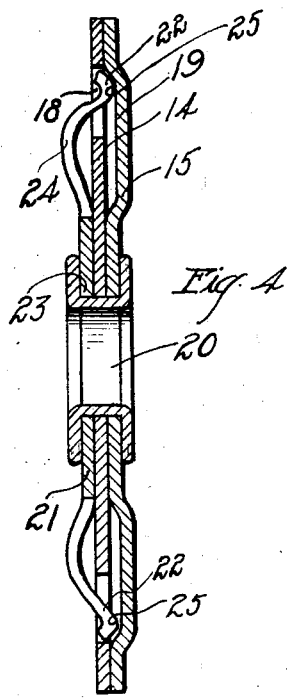
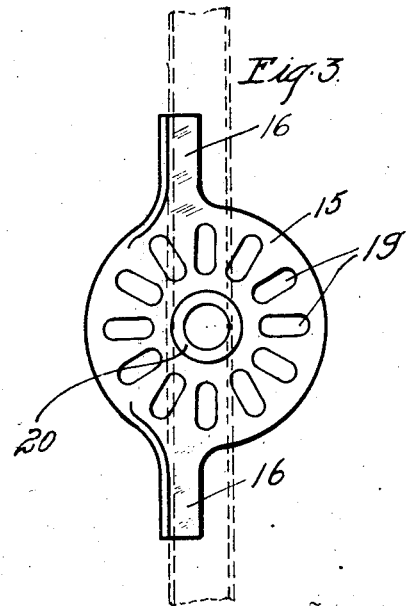
Inventor  
Edwin A. Henricson  
By Whittemore Hulbert Whittemore  
Belknap   Attorney Patented Apr. 24, 1928.

1,666,899

UNITED STATES PATENT OFFICE.

EDWIN A. HENRICSON, OF DETROIT, MICHIGAN, ASSIGNOR TO MOTOR PRODUCTS CORPORATION, OF DETROIT, MICHIGAN, A CORPORATION OF NEW YORK.

WINDSHIELD PIVOT.

Application filed March 9, 1925. Serial No. 14,263.

This invention relates to windshield pivots, and particularly to an adjustable self-locking pivot especially designed for use in connection with the windshields of motor vehicles and the like.

An object of this invention is to provide a construction of this character which is distinguished by its simplicity, durability and capability of being manufactured at a minimum cost, these advantages being practical and assured by reason of the fact that the several parts comprising this improved pivot may be stamped out of sheet metal.

The advantages of this invention as well as the details of construction will be made more apparent as this description proceeds, especially when considered in connection with the accompanying drawings, wherein;

Fig. 1 is a fragmentary perspective view showing the application of a pivot constructed in accordance with this invention;

Fig. 2 is a plan view of one side of the pivot;

Fig. 3 is a similar view of the reverse side of the pivot; and

Figure 4 is an enlarged longitudinal sectional view through the pivot.

Referring now particularly to the drawings wherein like reference figures indicate like parts it will be noted that in Fig. 1 there is illustrated a fragmentary portion of an upright or support 10, which in practice would be one of the sides of the automobile frame or body, together with a fragmentary portion of a windshield 11 provided with a frame 12. While for the purpose of illustration a conventional form of support, windshield and windshield frame has been illustrated, it will be apparent, as this description proceeds, that the invention is applicable to any of the various types of frame and windshield constructions.

The pivot consists essentially of a pair of complementary pivot members or plates 14 and 15, preferably, although not necessarily, substantially circular in plan view. Each of the pivot members 14 and 15 is provided with a pair of oppositely extending angular bracket portions 16 adapted to embrace either the support 10 or the windshield frame 12 as illustrated in Fig. 1, and suitably apertured to receive securing means 17 through the medium of which the pivot members are respectively attached to the parts to be connected.

One of the pivot members, here shown as pivot member 14, is provided with a plurality of radially arranged apertures 18 while the other pivot member is provided with a plurality of depressions 19, also spaced and radially arranged. The apertures 18, as well as the depressions 19, are arranged radially with reference to the point of pivotal connection between the plates 14 and 15 and about which these plates rotate relatively to one another during the operation of the pivot.

The pivotal connection between the pivot members 14 and 15 is afforded by means of a pivot sleeve 20 extending through aligned apertures in the plates 14 and 15 with the ends thereof flared or bent outwardly to secure the plates in their assembled relation. The sleeve 20 also embraces a spring detent in the form of a spider 21 centrally apertured for the reception of the sleeve 20 and provided with a plurality of prongs 22.

The central portion 23 of the spider is arranged in a plane parallel to the plane of the pivot members 14 and 15 while each of the prongs bows outwardly as at 24 and then projects in an opposite direction so as to extend through the adjacent aperture 18 and into bearing engagement with the adjacent depression 19, as shown at 25. After assembly the prongs 22 project permanently through the apertures 18 and normally have a bearing engagement within the depressions 19. Obviously, the spider will move with the disk 14 during the rotation of the pivot members and upon such a rotation the spring prongs 22 ride up on the sides of the depressions 19 to thus release the inter-locking engagement between the pivot members, whereupon the windshield can be swung to the desired position at which time the spring prongs 22 snap back into the adjacent depressions 19.

It will be noted that while a multi-prong spider or spring detent is illustrated that a relatively larger number of depressions 19 are illustrated so as to increase the interlocking engaging positions of the parts. It will be immediately apparent, however, that the number of prongs 22 as well as the number of depressions 19 may either be increased or decreased as found desirable.

With the construction as herein described the pivot members may be quickly and easily attached to the windshield and adjacent supports so that the windshield may be adjusted as desired, the spring spider automatically releasing and holding the windshield as it is adjusted and released. It will also be apparent that this pivot comprises relatively few parts, the construction of which makes it possible to stamp the same out of sheet metal, thus minimizing the cost of manufacture.

The hereinbefore mentioned modifications and possibly others may be made in the embodiment of the invention herein illustrated without departing from the spirit of the invention and to this end reservation is made to make such changes as may come within the purview of the accompanying claims.

What I claim as my invention is:

1. In a pivotal connection, a pair of pivot members adapted for attachment respectively to the parts to be connected and a spider having a spring arm projecting through one of said members into abutting engagement with the other affording a releasable interlocking connection between said pivot members for holding the same in their adjusted position.

2. In a windshield pivot, a pair of rotatably connected pivot members adapted for attachment respectively to the windshield and the adjacent support, said members being provided respectively with an aperture and a depression and an inherently resilient arm adapted for projection through said aperture and engaging said depression for locking said pivot members in their adjusted position.

3. In a windshield pivot, a pair of rotatably connected pivot members adapted for attachment respectively to the windshield and the adjacent support, said members being provided respectively with an aperture and a depression and a multi-finger inherently resilient spider supported at the point of connection of said pivot members and adapted for projection through said aperture and engaging said depression for locking said pivot members in their adjusted position.

4. In a windshield pivot, a pair of rotatably connected pivot members adapted for attachment respectively to the windshield and the adjacent support, said members being provided respectively with radially arranged apertures and depressions and a multi-pronged spring detent having a body portion riveted to said pivot members and bowed portions projecting through said apertures and engaging said depressions for releasably locking said pivot members in their adjusted position.

5. In a windshield pivot, a pair of rotatably connected pivot members adapted for attachment respectively to the windshield and the adjacent support, said members being provided respectively with spaced apertures and depressions arranged radially with respect to the point of connection of said pivot members, and a multi-pronged spring spider secured to the pivot of said pivot members, with the prongs thereof bent outwardly adjacent their ends and then inwardly and projecting through said apertures and engaging said depressions, for locking said parts in their adjusted position.

6. In a windshield pivot, a pair of rotatably connected pivot members adapted for attachment respectively to the windshield and the adjacent support, said members being provided respectively with spaced apertures and depressions arranged radially with respect to the point of connection of said pivot members, and a multi-pronged spring spider clamped to the assembled pivot members, with the prongs thereof bowed and projecting through said apertures and engaging said depressions, for locking said parts in their adjusted position.

7. In a windshield pivot, a pair of rotatably connected sheet metal pivot members adapted for attachment respectively to the windshield and the adjacent support, and a sheet metal spider having a body portion lying flush against one of the said members and a bowed spring arm projecting through the same into abutting engagement with the other pivot member affording a releasable interlocking connection between the said pivot members for holding the same in adjusted position.

8. In a windshield pivot, a pair of sheet metal stampings, the said stampings constituting pivot members adapted for attachment respectively to the windshield and the adjacent support, said stampings being provided respectively with radially arranged apertures and depressions, and a third sheet metal stamping constituting a spider, said spider being arranged outside of the said pivot members and having a plurality of spring arms projecting through the said apertures and engaging the said depressions for releasably locking said pivot members in their adjusted position.

In testimony whereof I affix my signature.

EDWIN A. HENRICSON.